Nov. 9, 1937.  A. F. HEGENBERGER ET AL  2,098,241
COMPASS
Filed Feb. 14, 1933  2 Sheets-Sheet 1
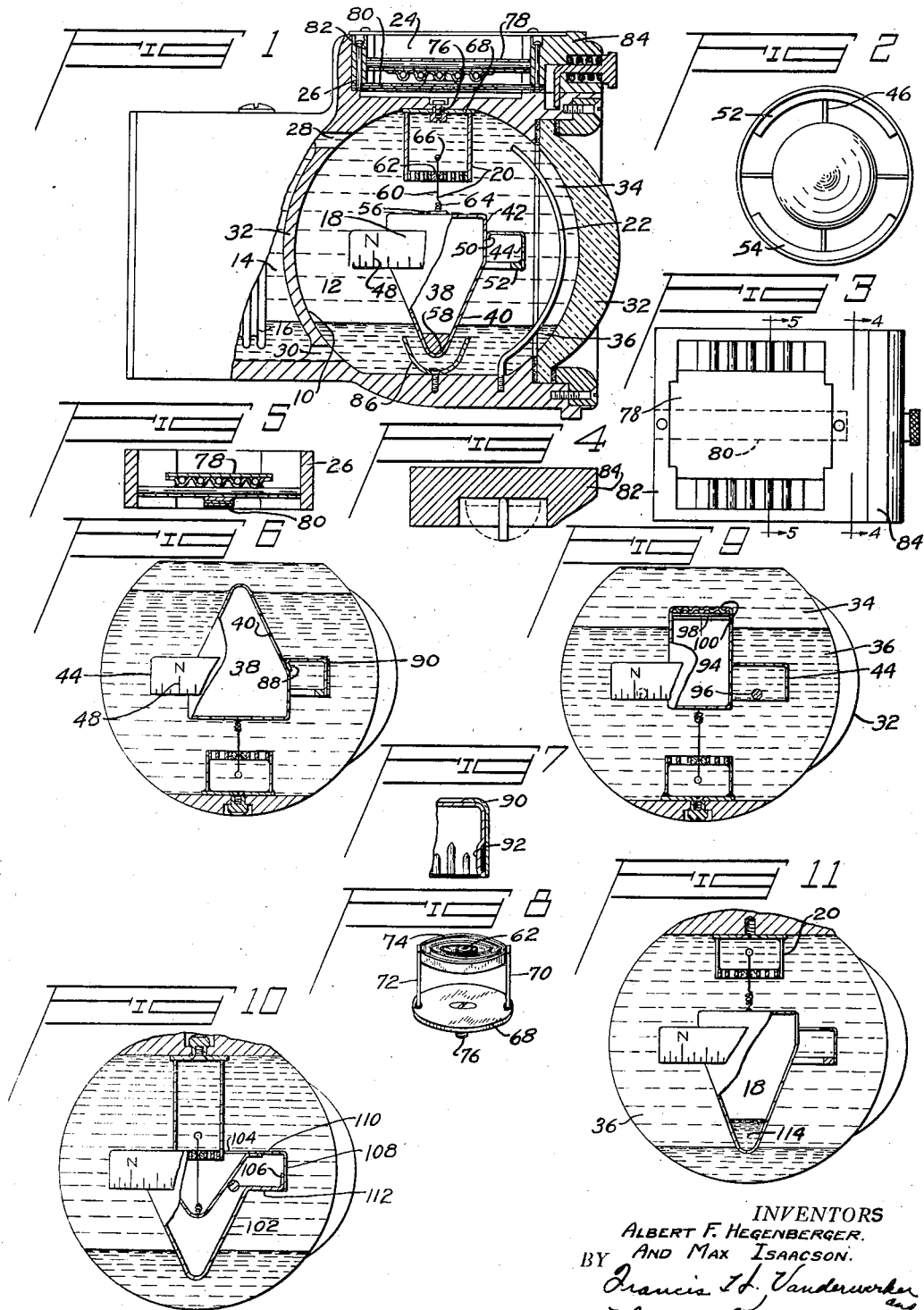
INVENTORS
ALBERT F. HEGENBERGER.
AND MAX ISAACSON.
BY
ATTORNEYS

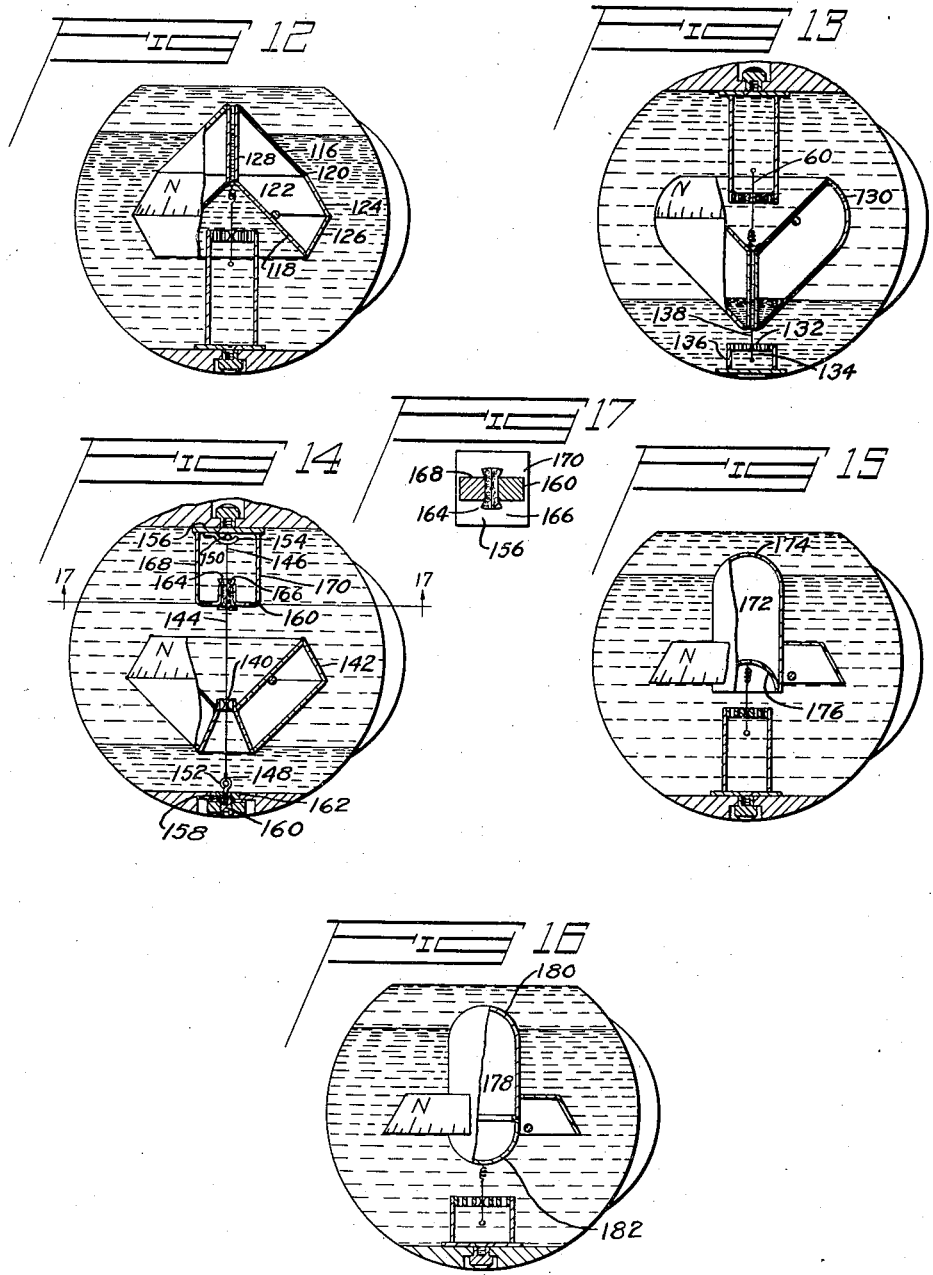

Patented Nov. 9, 1937

2,098,241

UNITED STATES PATENT OFFICE 2,098,241

COMPASS

Albert F. Hegenberger and Max Isaacson, Dayton, Ohio

Application February 14, 1933, Serial No. 656,708

33 Claims. (Cl. 33—223)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to liquid damped compasses in general and more in particular to the floated card type of liquid damped compass in which the card is immersed and floating between two immiscible liquids of different densities, and is especially useful in aircraft.

The development of a satisfactory airplane compass to meet the conditions in flight, such as vibrations, linear accelerations, rolls, pitches, yaws and bumps, each of which have their effect on the steadiness and accuracy of the card reading, has not prior to this invention been developed in spite of the fact that extended research and development work has been done heretofore.

Several types of liquid damped compasses including the so called "floating card type" and the "non-floating card type" are now in general use, but each of these for certain inherent characteristics of design will when used in flight perform in an unsatisfactory manner.

The card is the element of the liquid damped compass that most affects its performance and it is its construction and the manner in which it is suspended in the damping liquid that determines to a great extent its accuracy. It would appear that the optimum card performance is obtainable with a card that comes to rest in coincidence with the earth's magnetic lines of forces after a deflection in the least time with a minimum of oscillations. This, of course, necessitates a small moment of inertia and a damping resistance which is low relative to the magnetic moment of the system of magnets that are carried by the card. Although this combination of a high magnetic moment and a relatively low damping was possible of accomplishment, compasses using a single liquid damping medium in which the card is partially floated, that is, one in which the apparent weight of the card is reduced by the incorporation of a float and resting on a bearing or entirely floated and buoyantly supported against a bearing, as well as in compasses using a single liquid in which the card is non-floating or gravity, supported, nevertheless due to vibrational and frictional effects these cards were neither sensitive to the magnetic control so as to give a true indication of the magnetic north nor would they come to rest quickly as is particularly required in an airplane.

It is a well-known fact that one of the most serious causes of deviation of the compass magnet from its true heading or bearing is that of impacts imparted to the card under engine vibration. Various attempts have been made prior to this invention to overcome the effects thereof, but up to the present time with only partial success. The use of a resilient suspension between the compass magnet and its pivot has been suggested as a means of diminishing vibrational and frictional effects for liquid damped compasses of the single liquid type in which the pivot or bearing of the card is seated on its support either by gravity or floated thereagainst. While this system reduced the deviation to a point where it has proven useful up to certain speeds of the airplane engines, say 1900 R. P. M., 2100 R. P. M., beyond this range the resultant vibrations were such as to cause the card to deviate to an extent where it is practically useless.

Attempts have also been made by others prior to this invention to overcome these defects by floating a card between two liquids of different densities but with no practical success.

In floating a compass card between two liquids of different densities in the manner taught by the prior art a relatively large peripheral surface of the card is exposed to the common surface of the two liquids and the consequent surface tension, which is of considerable magnitude, when compared to the magnetic force of the magnets will effect an excessive drag upon the card, so as to render the same too sluggish to be practical and thus any tendency of the card to align itself with the earth's magnetic field is resisted to a considerable extent.

No provision has heretofore been made in a compass of the character shown in the above-referred to patent for overcoming the effects of surface tension nor for stabilizing the card against deviations resulting from impacts imparted thereto by the centralizing means under vibration of the compass. Nor was there heretofore provision made to vary the position of the compensating magnets or change the buoyancy of the card to compensate for the change in densities of the two liquids for varying temperatures such as occur during the different seasons of the year.

In order for the card to float between the two liquids of different densities there must be a density differential and the card must have a density that will fall within this differential range. It is found from actual experiment that if this differential of the two liquids is relatively large, the heavier liquid will readily displace the lighter liquid under vibration and thereby materially effect the stability of the card. It will be obvious therefore that the closer these liquids approach each other in density the less will be their relative displacement and the more stable will be the card. But it will also be obvious that the smaller the difference between the densities of the two liquids, the smaller will be the range of density within which the density of the card must fall to be adjusted to the liquids and the more sensitive will the card be to change in its buoyant position with changes in the liquid densities under temperature changes.

Accordingly this invention has for certain of its objects to provide a liquid damped compass with a card that is buoyantly supported between two liquids of different densities with the portion of the card bearing the cardinal points totally immersed in one of said liquids and having a minimum of circumferential length or surface area exposed to the common surface of the two liquids consistent with obtaining either a minimum of surface tension drag or the best combination of minimum surface tension drag and minimum changes in the buoyant position of the card where temperature change effects are material, to provide in a liquid damped compass, a means for centralizing the card relative to the compass bowl and stabilizing or dampening its movements resulting from the force of the vibrational impacts due to the relative displacements of the bowl and card to provide a centralizing means in which the friction effect of the centralizing means on the card is reduced to a minimum, to provide in a compass of this character, in which compensating magnets are provided, means for preventing a vertical relative displacement of the card and said compensating magnets and to thereby prevent a change in the intensity of the magnetic field of said compensating magnets when changes in the densities of the liquids due to substantial changes in temperature occur; to provide in a compass of this character two immiscible liquid mediums that will conform to the well-known requirements for damping liquids and that will have their common surface of a relatively low rigidity so that the surface tension drag effect upon the card will be a minimum, and to provide a novel compass card construction, in which the luminous material applied to the cardinal points is protected against the deleterious effect of either of the dampening liquids.

Other and further objects of this invention will appear in the more detailed description of the invention hereinafter set forth.

In the drawings, which form a part of this specification and in which several modifications of our invention are shown by way of illustration:

Fig. 1 is a side elevational view of a compass embodying this invention, with parts broken away and in section;

Fig. 2 is a bottom plan view of the card shown in Fig. 1;

Fig. 3 is a top plan view of the compensating magnet carrier or drawer shown in Fig. 1;

Fig. 4 is a sectional view taken along the line 4—4 of Fig. 3;

Fig. 5 is a sectional view taken along the line 5—5 of Fig 3;

Fig. 6 is an elevational view of a modification of this invention showing the bowl of the compass in diagram and the parts of the magnetic card and its centralizing means in section;

Fig. 7 is an enlarged fractional detail view of the compass card ring;

Fig. 8 is an enlarged perspective detail view;

Figs. 9 to 16 inclusive show diagrammatic elevational views of different modifications of this invention, the card in each view being broken away and in section and with parts of the centralizing means in each view shown in cross-section; and Fig. 17 is a sectional view taken on the line 17—17 of Fig. 14.

Referring to Fig 1, the numeral 10 designates an aircraft compass bowl of well-known construction that is provided with two communicating chambers 12 and 14, both of which are completely filled with the damping liquid mediums of different densities, there being provided an expansion sylphon 16 in chamber 14 to permit expansion and contraction of the liquids with changes in temperature and a compass card 18, centralizing means 20, and lubber line 22 in substantially spherical chamber 12. Also positioned above chamber 12 is a chamber 24 that is provided with a front opening to receive compensating magnet carrier 26. Communication between chambers 12 and 14 is established by providing openings 28 and 30 at the top and bottom of the wall 32 that divides these two chambers. The front portion of the bowl is formed with an opening through which the compass card 18 and lubber line 22 may be observed. This opening is, of course, closed with a curved glass 32 of well-known construction and which is in general use.

The immiscible mediums designated by reference numerals 34 and 36 respectively are of different densities, the heavier liquid, of course, lying below the lighter liquid. Various suitable liquid mediums of different densities that are immiscible may be employed for this purpose and it is preferable that those liquids that are least corrosive to metals, varnishes, paints and lacquers and the like be used. Certain of the properties that constitute the requirements of good damping liquids are as follows: flat viscosity-temperature curve, reasonably low viscosity, low coefficient of expansion, high boiling point, low freezing point, colorless and non-volatile. Mixtures of liquids that do not emulsify, or in which the emulsification can be broken down by well-known processes may be used as the heavier and other liquids or liquid mixtures that do not emulsify in and of themselves nor with the heavier liquid may be used as the lighter liquid.

The difference in densities between the two liquid mediums, that is, the density differential must, of course, be sufficiently large to prevent bobbing up and down of the card, but this differential should not be too great as the heavier liquid medium would tend to displace the lighter liquid medium under vibration and under acceleration would have a pendulous effect, thus rendering the card unstable.

Accordingly the relative densities of the two liquid mediums may be chosen so that the card of given weight will be buoyantly suspended therebetween, the card may be adjusted to be buoyantly supported therebetween by weighting and/or by varying the size of the float, it being obvious that the card may be constructed so that the major portion of the card, that is the portion bearing the cardinal points, may be entirely immersed in either the lighter or heavier medium.

It will be understood that when the portion of the card bearing the graduations is disposed in either of the liquid mediums, it will be sufficiently above or below the common surface so that it will not contact therewith in its normal operation and preferably the card should be disposed in the one that possesses a greater number of the more desirable properties. As illustrated herein the naptha is more suitable than the mixture of glycol and alcohol and the cardinal bearing portion or major portion of the card is totally immersed in the naptha, which in this instance is the lighter medium. The naptha also has a less corrosive effect upon the luminous material than the mixture of ethyl glycol and alcohol and furthermore since the card is more easily wetted by the naptha than by the alcohol-glycol mixture the former medium serves as a shield against the deteriorating action of the latter.

It is preferable that both mediums be contained within a minimum of space thereof. The minimum volume permissible being limited only to the extent of the one liquid cooperating with the other to buoyantly support the card therebeween to that when substantially centrally disposed with regard to the bowl the card will be spaced as sufficient distance from the walls thereof as well as the lubber line so as not to strike thereagainst during its operation.

The card 18 of the embodiment as shown in Fig. 1, is centrally located by the centralizing means 20, hereinafter more specifically described, and it is adjusted to a density that is sufficiently heavier than the lighter liquid medium so that it will be suspended between the two liquid mediums with the major portion of the card immersed entirely within the lighter liquid medium and with the cardinal points arranged thereon so as to be observed from the front of the bowl.

In constructing this card an airtight float 38 is formed from two pieces of sheet metal of non-magnetic character, one piece being spun or formed in any well-known manner into a shape so as to have a conical portion 40 and a cylindrical portion 42, and the other piece is cut to a size corresponding substantially in area to the base of the cylindrical portion and secured thereto by soldering along their peripheral meeting edges. A ring 44, that constitutes the major portion of the card, has a spider 46 (Fig. 2) formed as a part thereof and bears the cardinal points 48 so as to be read from the side thereof. This ring is concentrically positioned with respect to the vertical axis $x$—$x$ of the float and is attached thereto by means of a tight fit between the annular flange 50 and the wall of the cylindrical portion or by soldering the same together. The ring 44 has attached thereto a pair of symmetrically arranged magnetic elements. These elements are in the form of arcuate bars 52 and 54 preferably bent upon an arc of a radius slightly smaller than the radius of the ring so that they conform to the inner side wall of the ring to which they are soldered. The magnets or the ring carrying the magnets may be positioned with respect to the float so that the center of gravity of the card as a whole will be below, coincident with or above the center of buoyancy. It will be obvious that as the center of gravity approaches the center of buoyancy the card becomes less and less stable and when it is positioned above the center of buoyancy it is no longer stable. It is preferable that the center of buoyancy and the center of gravity be substantially coincident for then the force due to the inertia of the liquid displaced by the float when the bowl is vibrated will act at the center of gravity of the liquid displaced and also at the center of gravity of the card and since the mass of the liquid displaced is equal to the mass of the card, the force will therefore be of a magnitude required to accelerate the card the same as the bowl is accelerated.

It will be observed that the card as a whole is made symmetrical, the several components thereof being respectively made of uniform materials. In this way a balanced card is readily obtainable. To adjust the card so that it will assume the proper buoyant position and have the center of gravity thereof properly located with respect to the center of buoyancy it may be necessary to add weights to the card. In accordance with the embodiment in Fig. 1, a normally solid substance, such as wax or the like, is heated to a fluid state and poured into the float 38 through an opening that is closed by soldering a plate 56 thereover, until the desired weight of the card is obtained. The wax material 58 will distribute itself uniformly before solidifying and the balance of the card, which, as heretofore described, is obtained by its peculiar construction, will therefore not be disturbed.

It has been found by experiment that a mixture of 75 per cent commercially pure alcohol and 25 per cent commercially pure ethyl glycol is suitable for the heavier liquid and that the generally used compass liquid, that is naptha or kerosene, is suitable for the lighter liquids and is found to satisfactorily meet the above-enumerated requirements. The proportions of the alcohol and ethyl glycol mixture may be varied to meet the needs for different conditions. Mixtures ranging from 25 to 50 per cent of ethyl glycol with the remainder alcohol, may be used satisfactorily. Glycerine may be substituted for the ethyl glycol in the heavier medium and in the same proportions. Mixtures of glycerine and alcohol have been found to give excellent results with small temperature changes. Extremely low temperature increases the viscosity of the heavy medium containing glycerine and renders the card sluggish in its response to the magnetic control. The heavier and lighter liquid components are thoroughly agitated in a centrifuge and then the same is filtered by passing the same through filter paper or fuller's earth for removing any precipitation that may thus be formed. Any well-known process for removing the emulsion that may be formed within the one or the other of the two liquid mediums may be made use of.

The weight or density of the card, as shown in this view, is sufficiently heavier than the density of the lighter medium such that changes in the density of the liquid medium during small temperature changes will not materially affect the position of the card, but it is sufficiently lighter than the heavier liquid so that the circumferential linear dimension of that portion of the conical float that lies within the common surface is relatively small whereby the drag effect due to surface tension is practically negligible. It will, of course, be understood that the float is constructed so that it is substantially non-expansible or contractable with differential pressure changes and any suitable material may be used for this purpose. The buoyant means need not be a hollow float but it may be made of a solid material having a density sufficiently lighter than the liquid of heavier density to effect the desired results.

The centralizing means 20, which serves to position the card substantially centrally with respect to chamber 12 and to maintain the same in the neutral position as determined by its buoyancy and magnetic control, comprises, as shown in this view, a vertical stem 60 that is flexibly connected to the card at a point that lies substantially along the vertical center line of gravities of the card and an open bearing 62 for the stem. This stem is made of fine wire and is attached by soldering or the like to the plate 56 and is free at its other end, the stem being preferably formed adjacent its attached end with a few turns in the form of a small coil 64, that constitutes a flexible connection and serves to absorb vibrational impacts imparted to the stem from the bearing or by the relative displacements of the card and bowl. The stem is preferably provided at its free end with a retaining bead 66. The wire from which the stem is made should be sufficiently strong to resist bending under the inertia effects of the bead for otherwise, if the card is sensitively adjusted with respect to the two liquid mediums, the moment of inertia of the stem will be bent over the bearing sides as it is vibrated and lift the card upward from its normally buoyant position. This effect is intensified as the card is elevated due to the increase in the length of the stem above the point of bearing between the stem and open bearing with a consequent increase in the moment arm.

The open bearing, as illustrated in this view, is floatingly supported by means of a resilient support in such a manner that the bearing is capable of yielding in directions that are in line with the axis of the bearing opening and in directions that are transverse thereto. The support which consists of a base plate 68, two spaced arms 70 and 72 projecting in this instance downwardly from the plate 68, a spiral coil spring 74 disposed between said arms and having its outside coil attached to said arms by soldering and a threaded projection 76 extending upwardly and securing said support to the bowl. The coil spring is positioned intermediate the bead 66 and the coil 64, and is sufficiently spaced therefrom as to avoid interference therewith under vertical displacement of card in bumpy weather or for other reasons. The innermost coil of the spiral spring has a small opening therethrough and is properly located so that its axis substantially coincides with the vertical axis of the chamber. This opening is preferably of a size so as to provide a close sliding fit with the stem. An open jewel may be used if desired and as shown the same is seated in the innermost coil, which, is, of course, formed with an opening sufficiently large to receive the jewel. The opening of the jeweled bearing gradually increases in diameter from the central portion to both ends so that card and bowl are capable of tilting relative to one another from the vertical axis without introducing a bending effect upon the stem or spiral spring and furthermore there is obtained by this construction a minimum of friction between the stem and its open bearing due to their line contact.

Suitable means is provided to maintain the relative elevation of the magnetic elements and the compensating magnets substantially constant irrespective of changes in the density of the liquid medium. Relatively large variations in temperatures that take place with the changing seasons or altitudes of flight may tend to vary the densities of the liquid mediums with a consequent change in the distance between the card magnets and the compensating magnets.

One variation of avoiding a material change in the normally predetermined distance between said different magnets consists in causing the compensating magnets to automatically move vertically and in correspondence with the movements of the card as the buoyant position of the card changes with changes in the densities of the liquid. Accordingly the compensating magnet carrier 26 is constructed in the form of a drawer, that is removably positioned within and closes the chamber 24. A compensating magnet support 78 is disposed within the drawer and is slidably connected thereto by means of grooves and tenon connections between the adjacent ends of the drawer and the support. A bimetallic strip 80 is preferably disposed between the ends 82 and 84 of drawer 26 and at the bottom thereof, the strip being connected at its ends to the ends of the drawer and at its mid portion to the support. By arranging the bimetallic strip so that its component having the greater coefficient of expansion is disposed at the bottom it will be observed that the bimetallic strip will bow upward when exposed to cold temperatures, thus causing the compensating magnets to be moved bodily vertically and in the same direction as the card is caused to move by the increase in the densities of the liquids and vice versa when it is exposed to warm temperatures.

Suitable means may be provided to prevent the card from tilting and/or moving laterally relative to the bowl beyond a predetermined range. This is especially desirable where the eccentric position of the open bearing with respect to the center of the bowl is such that the card when caused to tilt about the same would if unrestricted, strike against bowl or lubber line. To this end a cup-shaped member 86 is threaded to the bottom of the bowl and is adapted to receive and be equally spaced from the apex of the conical portion of the float when the card is in the neutral position, the cup-shaped member extending upwardly a sufficient distance to prevent accidental displacement of the card.

Further variations of the invention are described herebelow and illustrated in Figs. 6 to 17 inclusive of the drawings.

Referring to Fig. 6, it will be seen that the construction of the card is similar to that shown in Fig. 1 except that the ring 44 is inverted with the annular flange 88 soldered to the conical portion 40. The stem and bearing constituting the centralizing means being in this instance attached to the bottom of the float and bowl respectively. The heavier liquid medium occupies the greater volume of the bowl and the card is disposed with respect to the two liquid mediums such that the ring 44 is entirely immersed in the heavier liquid medium and the apex of the float either bearing slightly or penetrating upwardly into the lighter medium. This relative position of float and liquids is suitable only where there is very little change in temperature conditions. Since glycol and/or alcohol has a deteriorating effect upon the luminescent paint material it may be desirable to provide a shield that is not readily attacked by said liquids and accordingly the ring may be formed with a thin shield 90 of glass or equivalent transparent material, the luminescent graduations or cardinal points 48 being embedded in recesses 92 in the metal ring and covered by the glass ring, the adjacent edges of these rings being sealed against the ingress of the heavier liquid by a suitable binder for glass and metal.

Fig. 9 is a further variation similar to Fig. 6, but showing the card as having a float made in the form of a cylinder 94. By having a relatively large volume of float as compared to that of Fig. 6 in the lighter medium the vertical displacement of the card for the same changes in the densities of the liquids will be less with the former card than with the latter. This arrangement is desirable where extreme changes in temperature take place. The magnetic elements are in the form of straight bars 96. The predetermined distance between the card magnets and the compensating magnets may be maintained in this embodiment by providing a bimetallic strip 98 within the float, the strip being connected to the center portion of a diaphragm 100 and at its ends to the cylinder wall. This strip serves to prevent expansion of the diaphragm with pressure changes, but effects expansion or contraction thereof with temperature changes, thus increasing or decreasing the buoyancy of the float as the density is decreased or increased respectively. With this arrangement the automatic movement of the compensating magnets may be dispensed with, although both may be used if desired.

Fig. 10 is a further variation showing the card in the form of float having interfitting dome or conical-shaped portions 102 and 104 that are soldered together along their respective flanged edges 106 and 108, the flanged edge 108 bearing the cardinal points. In this variation the magnets are preferably circular and are disposed within and between the flanges 110 and 112 of the dome shaped portions respectively. The particular elevation of the magnets being such as to have the center of gravity substantially at the center of buoyancy, this construction of float lends itself suitably to the placing of the open bearing close to the center of the bowl and in proximity to the center of gravity and center of buoyancy of the card so that the cup-shaped member 86, as shown in Fig. 1, is not necessary and that primarily the moment arm as represented by the distance from the center of gravity to the point of the open bearing is small, thus reducing the torque when a relative displacement of the card takes place to a minimum. The attached end of the stem is positioned below the center of gravity, but it may be at the center of gravity if desired. A further feature of this variation is that since the conical or dome-shaped portion is inverted and disposed in the heavier medium the surface tension and viscosity drag effect of the heavier liquid will gradually become less as the card rises due to an increase in its density.

Fig. 11 shows a variation of this invention that is similar to Fig. 1 except that the card has a small portion of the conical float in the heavier liquid that is, the card is slightly heavier than the lighter liquid so that the residual weight of the card is small and is yieldingly supported either by the common surface tension in the manner already indicated in connection with Fig. 6 or by both surface tension and displaced heavier liquid depending upon the amount of residual weight of the card and that instead of using wax or the like as a means of weighting the card, a liquid 114 is made use of. By so doing the center of gravity of the card and the center of buoyancy of the liquid displaced by the card will always be in the same line, if the center of gravity is above or below the center of buoyancy and there will not therefore be any binding effect between the stem and bearing when the card is tilted within its permissible tilting range.

Fig. 12 shows a further variation of my invention in which the float has its cardinal bearing portion disposed in the heavier liquid with the centralizing means having the bearing or pivot point of the card disposed substantially at the center of the bowl. The card is similar in type to that shown in Fig. 10, it being constructed of two complementary conical or dome-shaped members 116 and 118 that are jointed together along their peripheral edges at 120. The member 118 is provided with a ring member 122 that is formed in the shape of two oppositely disposed truncated conical portions 124 and 126 having a common base. With this arrangement the graduations representing the cardinal points may be applied on the upper truncated conical portion 124, as shown in this view or on the lower portion 126 when the card is used in the inverted position. The two complementary members 116 and 118 are further jointed at their apexes by means of a tube 128 that is passed through openings formed therein. The tube is open at both ends to permit the passage of air bubbles that may be trapped within the hollow of the member 118. The card is preferably arranged so that the common surface of the truncated conical portions of the ring 112 is at the mid portion of the bowl.

The modification shown in Fig. 13 is similar to Fig. 12 except that it is of the inverted type as shown in Fig. 1 and that the ring member 130 is arcuate in cross-section with the cardinal points disposed on a portion of the ring that is above its greatest diameter in this position of the card. It will be seen that when the card is used in the inverted position that the cardinal will be placed on the portion of the ring below its greatest diameter. Additional means is provided to further centralize the card with respect to bowl and it is illustrated herein as consisting of an open bearing 132, a spiral spring 134 and a support 136 of the same construction as that described in connection with Fig. 6 and a centralizing straight stem 138. This stem may be provided with a coiled portion in the same manner as the coil 64 formed as part of stem 60. By providing the two floating bearings excessive tilting of card is prevented, thus eliminating the consequent effects due to the vertical component of the earth's magnetic field when the compass is accelerated or decelerated lineally, practically reducing it to a minimum. The card may also be provided with a liquid ballast for purposes hereinabove described and the card may be adjusted so that the center of gravity is above the center of buoyancy, thus any tendency of the card being tilted by a relative displacement of the liquids when the compass is accelerated will be offset by the tendency of the card to tilt in an opposite arse.

A further variation of this invention is shown in Fig. 14. In accordance with this embodiment the open bearing 140 is carried by the card 142 and the stem 144 is supported by the bowl. As shown the stem 144 is connected at both of its ends 146 and 148, but it is obvious that if desired it can be formed similar to the stem in Fig. 1 and connected to the bowl at the end portion having the coil 64. The stem 144 is preferably made of wire or other suitable filament, the upper and lower ends of which are attached to eye members 150 and 152 respectively. The eye member 150 slips over a hook member 154 that is fixedly connected to a support 156, which in turn is threaded to the bowl. The eye member 152 is provided with a threaded stem 158 that is engaged with a cap screw 160, that is locked by a lock nut 162. By adjusting the screw along the stem the tension of the wire may be varied and thereby vary its natural vibrating frequency.

There is also provided in this embodiment a dampening means to dampen certain of the vibrations of the wire. This means consists in having the wire interposed between two strips 164 and 166, made of felt that are separately and suitably connected to the arms 168 and 170 respectively of the support but preferably in intimate contact with one another and with the wire.

Figs. 15 and 16 show two further modifications of the invention, both of which show the card similarly arranged with respect to the bowl, the liquids and the centralizing means, though differing from one another in the particular construction of the float. In Fig. 15 the ends of the cylindrical float 172 are formed with convex and concave portions 174 and 176 respectively, whereas in Fig. 16 both ends of the cylinder 178 are formed with convex portions 180 and 182. By constructing the ends or bases of these floats of semi-spherical contour a minimum of expansion due to large differences of internal and external pressures will take place.

Having thus described this invention, what we claim as new and desire to secure by Letters Patent is:

1. A liquid damped magnetic compass comprising, two suitable immiscible mediums of different densities and a magnetically controlled card having a mean density greater than that of the lighter medium but sufficiently less than that of the heavier medium so that a major portion of the card, including the portion bearing the cardinal points, is buoyantly supported in the lighter liquid medium, and having a form such that the portion of the card that lies in the common surface of said mediums is sufficiently small in cross-sectional area as to effect a negligible surface tension drag.

2. A liquid damped magnetic compass comprising, two suitable immiscible liquids of different density and a magnetically controlled card having a mean density greater than that of the lighter liquid but sufficiently less than that of the heavier liquid so that a major portion of the card, including the portion bearing the cardinal points, is buoyantly supported in the heavier liquid and having a form such that the portion of the card that lies in the common surface of said liquids is relatively small in cross-sectional area such that its surface tension drag effect is negligible.

3. A liquid damped magnetic compass comprising, two suitable immiscible liquid mediums of different densities and a magnetically controlled card having a mean density greater than one of said mediums but less than the other so as to be buoyantly supported therebetween and having a form such that the portion thereof that is within the common surface of said medium is relatively small compared to the maximum corresponding dimension of the remaining portion of said form that its surface tension drag effect is negligible compared to the directive power of the magnetic control.

4. In a liquid damped magnetic compass, the combination with a magnetically controlled card, of a centralizing means for said card, said means comprising an open bearing and means for resiliently connecting the same to said bowl and a resilient stem fixed at one end to the card and having its free end passing through the open bearing, and means provided at the free end of said stem to prevent separation of said stem from said open bearing but sufficiently spaced therefrom to avoid contact therewith within the normal operative range of relative vertical displacement of said card and bowl.

5. In a liquid damped magnetic compass, two suitable immiscible liquids of different specific gravities, a magnetically controlled card having a mean density greater than one but less than the other of said liquids and having its center of buoyancy above its center of gravity and a centralizing means for said card, said means comprising an open bearing connected to said bowl and a vertically disposed stem having a coiled portion at one end and a straight portion at the other, the outer end of the coiled portion being connected to the card at a point coincident with the center line of gravity and the straight end extending through said bearing so that said card is free to move in response to its magnetic control.

6. In a liquid damped magnetic compass, two suitable immiscible liquids of different specific gravities, a card having a mean density greater than one but less than the other of said liquids and having its center of buoyancy and center of gravity in substantial coincidence and a centralizing means for said card, said means comprising an open bearing connected to said bowl and a vertically disposed stem having a coiled portion at one end and a straight portion at the other, the outer end of the coiled portion being connected to the card at a point coincident with the center line of gravity and between the center of gravity and the center of buoyancy of said card and the straight end extending through said bearing so that said card is free to move in response to its magnetic control.

7. In a liquid damped magnetic compass, two suitable immiscible liquids of different specific gravities, a card having a mean density greater than one but less than the other of said liquids and having its center of buoyancy above its center of gravity and a centralizing means for said card, said means comprising a resiliently mounted bearing having an opening centrally disposed and carried by said bowl and a vertically disposed stem having a coiled portion at one end and a straight portion at the other, the outer end of the coiled portion being connected to the card at a point coincident with the center line of gravity and between the center of gravity and the center of buoyancy of said card and the straight end extending through said bearing opening so that said card is free to move in response to its magnetic control.

8. In a liquid damped magnetic compass, two suitable immiscible liquid mediums of different specific gravities, a magnetically controlled card having a mean density greater than that of the lighter medium but sufficiently less than that of the heavier medium so that a major portion of card including the portion bearing the cardinal points is buoyantly supported in the lighter liquid medium, and having a form such that the portion of the card that lies on the common surface of said medium is sufficiently small in cross-sectional area as to effect a negligible surface tension drag and having its center of buoyancy above its center of gravity and a centralizing means for said card, said centralizing means comprising a bearing having an opening disposed substantially centrally within and carried by said bowl and a vertically disposed stem projecting upwardly from said card, said stem having a coiled portion at one end and a straight portion at the other, the outer end of the coiled portion being connected to the card at a point lying in a vertical line through the center of gravity and the straight end extending through said bearing opening so that said card is free to move in response to its magnetic control.

9. In a liquid damped magnetic compass, two suitable immiscible liquid mediums of different specific gravities, a magnetically controlled card having a mean density greater than that of the lighter liquid but sufficiently less than that of the heavier liquid so that a major portion of the card including the portion bearing the cardinal points is buoyantly supported in the heavier liquid and having a form such that the portion of the card that lies in the common surface of said liquids is relatively small in cross-sectional area such that its surface tension drag effect is negligible and having its center buoyancy above its center gravity and a centralizing means for said card, said centralizing means comprising a guide supported substantially centrally within said bowl and vertically disposed stem depending from said card, said stem having a coiled portion at one end and a straight portion at the other, the outer end of the coiled portion being connected to the card at a point coincident with the center line of gravity and the straight end extending through said guide so that said card is free to move in response to its magnetic control.

10. In a liquid damped compass, a magnetic card bearing magnets and buoyantly supported within the bowl of said compass, a support carried by said bowl, compensating magnets for said magnetic card carried by said support and positioned to produce a predetermined effective field with respect to the magnets of said card, and a bimetallic strip between said support and said bowl for raising or lowering said compensating magnets with corresponding changes in the buoyant position of the card magnets due to increase or decrease in the density of the liquid medium.

11. In a liquid damped magnetic compass, comprising a bowl, two immiscible liquids of different densities within said bowl, a card bearing magnets and buoyantly supported between said liquids, a support, compensating magnets carried by said support, said compensating magnets being positioned to produce a predetermined effective magnetic field with respect to said card magnets and means carried by said card for effecting a relative vertical movement of said card and its supported magnets to maintain said effective field substantially constant irrespective of variations in the densities of said liquids.

12. In a liquid damped magnetic compass, comprising a bowl, two immiscible liquids of different densities within said bowl, a magnetically controlled card buoyantly supported between said liquids, a support, compensating magnets carried by said support, and compensating magnets being positioned to produce a predetermined effective magnetic field with respect to said card magnets, and means carried by said card to increase or decrease the buoyancy thereof to an extent sufficient to maintain the predetermined elevational distance of the card from said compensating magnets substantially constant irrespective of changes in the densities of said liquid medium.

13. In a liquid damped magnetic compass, the combination with a magnetically controlled card, of a centralizing means for said card, said means comprising an open bearing and means for resiliently connecting the same to said bowl and a resilient stem fixed at one end to the card and having its free end passing through the open bearing, and means associated with the free end of said stem to prevent separation of said stem from said open bearing but sufficiently spaced therefrom to avoid contact therewith within the normal operative range of relative vertical displacement of said card and bowl.

14. In a liquid damped magnetic compass, the combination with a magnetically controlled card, of centralizing means for said card comprising a bearing element having an opening therethrough and a vertical element passing through the opening of said bearing, one of said elements being supported by said card and mounted to be resiliently flexible laterally with respect thereto, and the other of said elements being supported by the compass bowl.

15. In a liquid damped magnetic compass, the combination with a magnetically controlled card, of centralizing means for said card, said means comprising a bearing element having an opening therethrough and a vertical element passing through said opening, one of said elements being supported by said bowl and resiliently flexible laterally in all directions with respect thereto and the other of said elements being supported by the card.

16. In a magnetic compass having a casing adapted to contain a liquid, the combination with a magnetically controlled card supported solely by a float attached thereto, of centralizing means for said card comprising a guide element having a substantially vertical opening therethrough, a vertical element passing through said opening, one of said elements being supported by and centrally of said card, means mounting the other of said elements to be resiliently displaceable laterally in all directions with respect to the casing.

17. In a liquid-damped magnetic compass, a magnetically-controlled card buoyantly suspended in a liquid medium within a bowl, a normally vertical resiliently flexible stem attached at one end to said card in the normally vertical line through its center of gravity, a bearing for said stem carried by the bowl, said bearing having an opening through which said stem extends whereby excessive lateral and tilting movements of said card are precluded.

18. In a liquid-damped magnetic compass, a magnetically-controlled card buoyantly suspended in a liquid medium within a bowl, a normally vertical resiliently flexible stem attached at one end to said card in the normally vertical line through its center of gravity, a bearing for said stem carried by the bowl, said bearing having an opening through which said stem extends, a point of contact between said stem and bearing being approximately at the center of buoyancy of said card, whereby excessive lateral and tilting movements of said card are precluded.

19. In a liquid-damped magnetic compass, a magnetically-controlled card buoyantly suspended in a liquid medium within a bowl, a normally vertical resiliently flexible stem attached at one end to said card in the normally vertical line through its center of gravity, a bearing for said stem carried by the bowl, a point of contact between said stem and bearing being approximately at the center of buoyancy and above the center of gravity whereby excessive lateral and tilting movements of said card are precluded.

20. In a liquid-damped magnetic compass, a card buoyantly supported by a liquid within a bowl, said card having a reentrant portion, a vertically-disposed stem attached to said card within said reentrant portion at a point substantially coincident with the normally vertical line through its center of gravity, a bearing for said stem, means resiliently supporting said bearing in the bowl, the point of contact between said stem and bearing being below the center of buoyancy of the card and approximately at its center of gravity, all surfaces of said card being surfaces of revolution.

21. In a liquid-damped magnetic compass, a card bearing a magnet and buoyantly supported within the bowl of said compass to move vertically with changes in density of the supporting liquid, a support vertically adjacent said card, a magnet on said support positioned to produce a compensating field at the magnet of said card, and means associated with one of said magnets for varying its position relative to said support to maintain constant the compensating field at the card magnet irrespective of said movements caused by density changes of the liquid.

22. In a liquid-damped magnetic compass, a card bearing a magnet and buoyantly supported within the bowl of said compass to move vertically with changes in density of the supporting liquid, a support vertically adjacent said card, a magnet on said support positioned to produce a compensating field at the magnet of said card, and automatic means associated with one of said magnets for varying its position relative to said support to maintain constant the compensating field at the card magnet irrespective of said movements caused by density changes of the liquid.

23. In a liquid-damped magnetic compass, a card bearing magnets and buoyantly supported within the bowl of said compass and movable vertically with changes in temperature, a support, compensating magnets for said magnetic card carried by said support and positioned to produce a predetermined effective field with respect to the magnets of said card, and bimetallic means associated with the carrying support of one of said sets of magnets for varying their position relative to their support to maintain constant the separation of said sets of magnets and the compensating field at the card magnets irrespective of vertical movements of the card due to density changes of the supporting liquid.

24. In a liquid-damped magnetic compass, the combination with a magnetically-controlled card, of a centralizing means for said card, said means comprising two complementary bearing elements respectively supported by the bowl and the card, one of said elements being mounted to be resiliently flexible in all directions laterally and the other being resiliently flexible laterally and vertically.

25. In an indicator, the combination with a magnetically controlled card and a support for said card, of centralizing means for said card comprising an open bearing carried by and having the opening thereof centrally and vertically disposed with respect to said card and a filament extending through said opening and tensioned to be vertically disposed and relatively rigidly connected with the housing of said compass.

26. In a liquid damped magnetic compass, the combination with a magnetically controlled card, of centralizing means for said card comprising an open bearing carried by and having the opening thereof centrally and vertically disposed with respect to said card, a filament extending through said opening, and means for adjustably tensioning said filament to be vertically disposed and relatively rigidly connected with the housing of said compass.

27. In a liquid damped magnetic compass, the combination with a magnetically controlled card, of centralizing pivot means for said card comprising an open bearing carried by and having the opening thereof centrally and vertically disposed with respect to said card, a filament extending through said opening cooperating with said pivot means to guide and centralize the card, means for adjustably tensioning said filament to be vertically disposed and relatively rigidly connected with the housing of said compass, and means for yieldably supporting said card.

28. In a compass, the combination with a liquid damped magnetic sensitive element, of a buoyant member for operably supporting such element, said member being provided with a thermo-expansible medium whereby a buoyant effect is produced that is substantially constant at different temperatures, and means for opposing the vertical movement of said element.

29. A liquid damping magnetic compass, comprising a bowl, a liquid of given density in said bowl, a magnetically-controlled card having a mean density slightly greater than the density of said liquid and substantially entirely immersed therein, and means associated with said card for maintaining the difference in said densities substantially the same throughout the operating temperature range.

30. A liquid damping magnetic compass, comprising a bowl, a liquid of given density in said bowl, a magnetically-controlled card having a mean density slightly less than the density of said liquid and substantially immersed therein, and means associated with said card for maintaining the difference in said densities substantially the same throughout the operating temperature range.

31. In a compass, the combination with a liquid damped magnetic sensitive element, of a buoyant member for operably supporting such element, said member being provided with a thermo-expansible medium whereby a buoyant effect is produced that is substantially constant at different temperatures.

32. In a compass, the combination with a liquid damped sensitive element, of a buoyant member for operably supporting said element, said member being provided with means for effecting an increase or decrease in the mean density thereof corresponding in values with the decrease or increase in density of said liquid with changes in temperature.

33. In a compass having a magnetically responsive element immersed in a liquid, of buoyant means for supporting the element including a closed expansible chamber provided with a thermo-responsive means for expanding or contracting said chamber to decrease or increase the mean density of said element and casing with changes in temperature.

ALBERT F. HEGENBERGER.
MAX ISAACSON.